June 16, 1936. J. G. SHODRON 2,044,370
METHOD AND APPARATUS FOR STORAGE, CURING, AND PRESERVATION OF HAY
Filed June 6, 1933
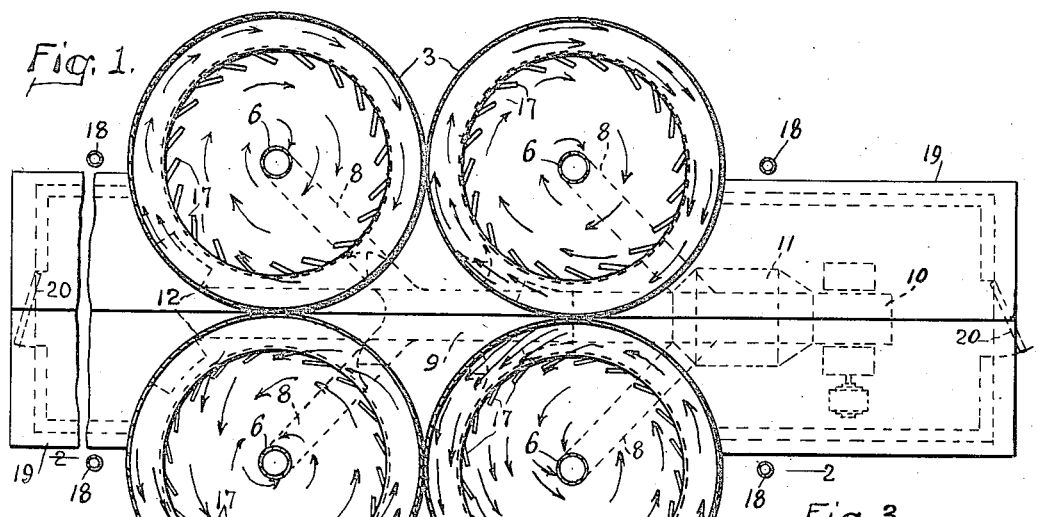
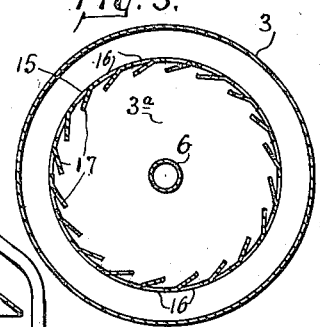
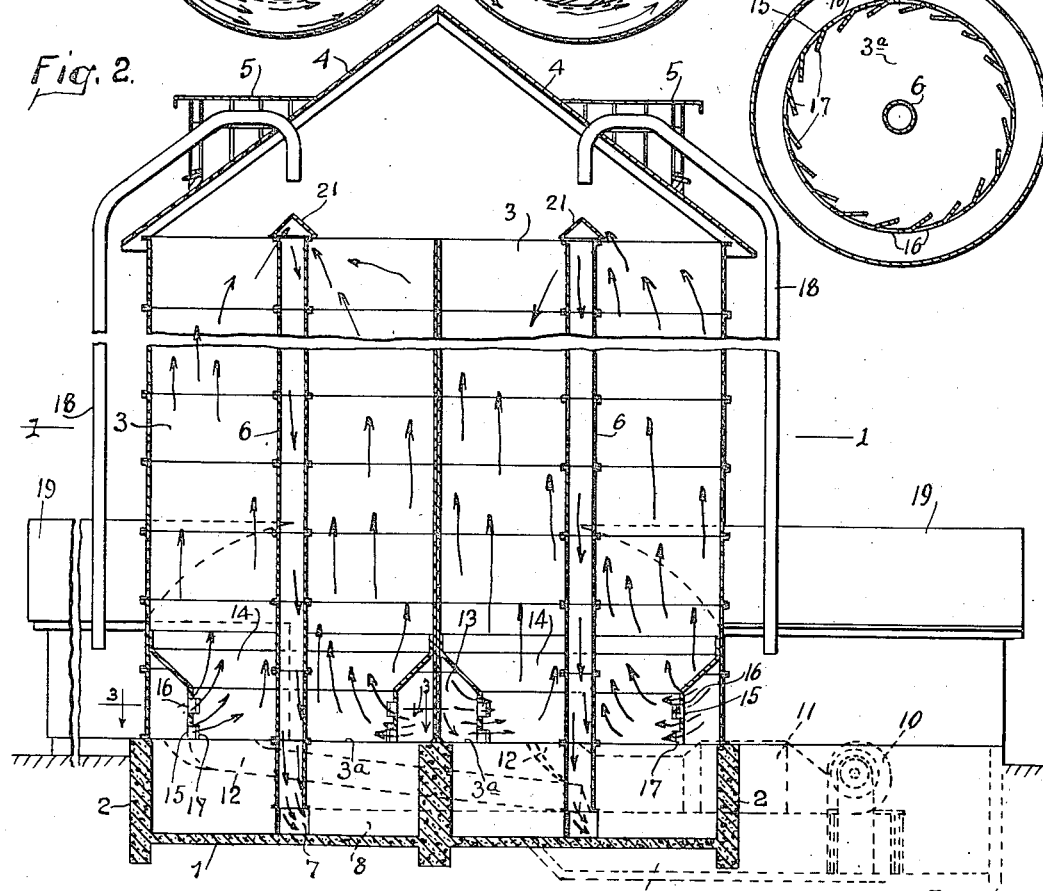
Inventor
JOHN G. SHODRON
Toulmin & Toulmin
Attorneys Patented June 16, 1936

2,044,370

UNITED STATES PATENT OFFICE 2,044,370

METHOD AND APPARATUS FOR STORAGE, CURING, AND PRESERVATION OF HAY

John G. Shodron, Fort Atkinson, Wis., assignor to James Manufacturing Company, Fort Atkinson, Wis., a corporation of Wisconsin Application June 6, 1933, Serial No. 674,555

4 Claims. (Cl. 98—54)

This invention relates to improvements in the storing and the preservation of hay, and has for its object to provide means whereby air may be forced into the bottom of a stack of hay, around the periphery thereof, and drawn out at the top and the center so that there is an equal and complete circulation of the air through the hay.

This invention relates to a method of treating hay, which involves the spiral circulation of air through a stack of hay, from the periphery thereof to the center, and withdrawing the air from the center of the stack.

These and other advantages will appear from the following description taken in connection with the drawing.

This application is a continuation in part of copending application, Serial No. 637,816, filed October 14, 1932, now Letters Patent No. 1,989,530, issued January 29, 1935.

Referring to the drawing:

Figure 1 is a section on the line 1—1 of Figure 2.

Figure 2 is a section on the line 2—2 of Figure 1.

Figure 3 is a section on the line 3—3 of Figure 2.

The numeral 1 is used to designate the floor of a basement or cellar which has side walls 2, supporting a container 3. In the present instance there are four of these containers supported on a group or nest of cellar walls. There may be a single container or any number of containers connected to be operated at the same time and through the same instrumentalities.

The containers are alike and each has a floor 3a, and all are covered by means of a single roof 4 so supported on top of the containers that it forms an air-tight connection with them so there may be produced a recirculation of the air within the containers without any outside air or with a controlled supply of outside air. The roof is provided with dormer windows 5.

Extending from the floor 1, in the center of each cellar, is a duct 6 which has at its bottom an outlet 7 leading into a duct 8 by which air may be carried into a common duct 9 forming the inlet of a blower 10. On the outlet of the blower are heating or cooling coils 11, through which the air from the blower 10 passes into ducts 12, which terminate in circular passageways 13 formed in the bottom part of the containers.

Each circular passageway is formed by the outside wall of the container, the floor of the container and inside wall 15 spaced from the container wall, and a sloping top 14 resting upon the inside wall and suitably connected to the container wall or outside wall. The inside wall has a plurality of apertures 16, each of which has extending over it a lip 17 for directing the air in a tangential path as it enters the container. The numeral 19 is used to designate a house structure connected to the nest of containers. In the present instance there are two of these house structures, in each of which is a door 20.

The tops of the duct 6 are substantially in line with the tops of the containers, each of which is provided with a cap 21 to prevent the hay entering the duct when it is being stored in the container. For delivering hay to the containers there is provided one or more pipes 18.

When the blower is operated air is drawn into the duct 6 from the tops of the containers. The air passes down these ducts and enters the blower. From the blower it passes into the annular passageways located at the lower ends of the containers. From these passageways the air is distributed into the containers in spiral streams which tend to circulate from the peripheries of the containers toward the center, up through the hay within the containers. The air must necessarily pass from the bottom of the stack of hay to the top, and from the periphery of the stack of hay to the center, thereby thoroughly permeating all parts of the stack.

It will be understood that I desire to comprehend within my invention such modifications as come within the scope of my claims and my invention.

Having thus fully described my invention, what I claim as new and desire to secure by Letters Patent, is:

1. In combination, a container for hay, means forming an air passageway for the delivery of air into the hay, said means consisting of a circularly arranged duct with vertical walls extending along a major portion of the wall of the container having a plurality of openings, each opening being provided with a lip facing tangentially in the same direction as the adjacent portion of the vertical wall of the container, whereby air passing out of said openings will have a circulatory motion, a duct located adjacent the center of the container and having inlet means therein, a blower having an outlet communicating with said air passageway, and an inlet connected to the duct whereby air is caused to pass from said air passageway through said openings to the duct and through the hay located therebetween.

2. In combination, a circular container for hay, a circularly arranged duct located adjacent the vertical peripheral wall of said container, a floor for supporting hay thereon, said duct having a plurality of circularly arranged openings, all of the openings discharging tangentially in the same direction as the walls of the container whereby air passing out of said duct will have a circulatory motion, an axially disposed duct in the container, said axially disposed duct having air inlet means therein, a blower having an outlet connected to said circularly-arranged duct and an inlet connected to said axially disposed duct whereby air may be caused to pass from the circularly arranged duct to the axially disposed duct and through the hay located therebetween.

3. The process of preserving hay which consists in arranging hay in a narrow mass within a container, causing currents of air to issue inwardly, in a substantially horizontal direction from adjacent the outer wall of the container, in a plurality of paths and at an acute angle to the peripheral walls of the container into the space occupied by the hay mass, all of said adjacent air currents being caused to flow inwardly in substantially the same direction and re-circulating at least part of said air through said hay.

4. The process of preserving hay which consists in arranging hay in a circular narrow mass within a container, causing currents of air to issue inwardly, in a substantially horizontal direction from adjacent the outer wall of the container, in a plurality of paths and at an acute angle to the peripheral walls of the container into the space occupied by the hay mass, all of said adjacent air currents being caused to flow inwardly in substantially the same direction and re-circulating at least part of said air through said hay.

JOHN G. SHODRON.